United States Patent [19]

Yabunaka

[11] Patent Number: 4,671,125

[45] Date of Patent: Jun. 9, 1987

[54] ENGINE STARTER WITH A PLANETARY REDUCTION GEAR

[75] Inventor: Kiyoshi Yabunaka, Himeji, Japan

[73] Assignee: Mitsubishi Denki Kabushiki Kaisha, Tokyo, Japan

[21] Appl. No.: 779,076

[22] Filed: Sep. 23, 1985

[30] Foreign Application Priority Data

Sep. 25, 1984 [JP] Japan ................................ 59-146271

[51] Int. Cl.[4] ......................... F02N 15/06; F16H 3/44; H02K 7/118

[52] U.S. Cl. ....................................... 74/7 E; 74/7 A; 74/421 A; 74/801; 290/48; 310/83; 310/88

[58] Field of Search ............ 74/7 A, 7 C, 7 E, 421 A, 74/801; 290/38 C, 48; 310/83, 88

[56] References Cited

U.S. PATENT DOCUMENTS

| | | | |
|---|---|---|---|
| 2,578,094 | 12/1951 | Sears | 74/7 A |
| 3,209,603 | 10/1965 | Rodriguez | 74/7 A |
| 3,908,492 | 9/1975 | Roskelley | 74/421 A X |
| 4,454,437 | 6/1984 | Tanaka et al. | 310/83 |
| 4,507,978 | 4/1985 | Tanaka et al. | 74/7 E |
| 4,510,406 | 4/1985 | Morishita | 74/7 E |
| 4,519,261 | 5/1985 | Hamano | 74/7 E |
| 4,520,285 | 5/1985 | Isozumi et al. | 310/83 |

FOREIGN PATENT DOCUMENTS

| | | | |
|---|---|---|---|
| 2628826 | 2/1978 | Fed. Rep. of Germany | 421 A/ |
| 58-132170 | 9/1983 | Japan . | |
| 2109471 | 6/1983 | United Kingdom . | |

*Primary Examiner*—Allan D. Herrmann

*Attorney, Agent, or Firm*—Leydig, Voit & Mayer

[57] ABSTRACT

An improved engine starter has a DC motor with a rotor shaft drivingly connected to an output shaft by a planetary reduction gear, the sun gear of the reduction gear being formed on the outer surface of the rotor shaft and the ring gear of the reduction gear being located on the inner surface of the yoke of the DC motor. The improvement comprises the yoke having a support portion integrally formed thereon which rotatably supports a one-piece end of the output shaft which is connected to the rotor shaft. Preferably, the yoke is formed by deep drawing of mild steel. A dust preventing member forms a labyrinth seal around the rotor shaft and prevents dust from entering the motor from the reduction gear.

7 Claims, 3 Drawing Figures

ENGINE STARTER WITH A PLANETARY REDUCTION GEAR

BACKGROUND OF THE INVENTION

This invention relates to a starter for an internal combustion engine of an automobile, and in particular to an improved starter having a planetary-type reduction gear.

FIG. 1 illustrates an example of the type of starter to which the present invention relates, the example shown in the figure being one disclosed in Japanese Laid Open Utility Model Application No. 58-132170. Since the starter is basically symmetrical about a centerline, only one half of the starter is illustrated. The starter has a direct current (DC) motor comprising a stator having magnetic poles 1, a cylindrical yoke 2 surround the stator and by which the poles 1 are supported, and a rotor within the stator having a rotor core 3, a rotor shaft 4, and rotor windings 5. The right end of the rotor shaft 4 is connected to an output shaft 6 through a planetary reduction gear. The output shaft 6 is rotatably supported at the end distant from the rotor shaft 4 by a front bracket 7 through a journal bearing 8, while the other end of the output shaft 6 is rotatably supported by a middle bracket 9 through a journal bearing 10, the middle bracket 9 being rigidly secured to the yoke 2. At the end adjoining the rotor shaft 4, the output shaft 6 has a hollow portion **6*a* on the outside of which is formed a flange 6*b*. One end of the rotor shaft 4 is rotatably supported by a journal bearing 11 provided on the inner surface of the hollow portion 6*a* and is separated from the output shaft 6 in the longitudinal direction by a steel ball 12. The flange 6*b* of the output shaft 6 has a number of support pins 13 secured thereto at intervals along its circumference, and each support pin 13 rotatably supports a planet gear 15 through a journal bearing 14 which fits over the support pin 13. Each of the planet gears 15 meshes with a sun gear 4*a* formed on the outer surface of the rotor shaft 4 and with a ring gear 2*a* formed on the inner surface of the yoke 2. The sun gear 4*a*, the ring gear 2*a*, and the planet gears 15 constitute the planetary reduction gear which drivingly connects the rotor shaft 4 with the output shaft 6**.

An overrunning clutch 16 is mounted on the output shaft 6 and is connected thereto by a helical spline **6*c* formed on the outer surface of the output shaft 6. The outer race 17 of the overrunning clutch 16 is slidably mounted on the spline 6*c* so as to rotate therewith while being able to move in the axial direction of the output shaft 6. The inner race 18 of the clutch 16 is rotatably mounted on the output shaft 6 through a journal bearing 22, which enables it to move axially along the output shaft 6 together with the outer race 17 and at the same time enables it to rotate with respect to the output shaft 6. A pinion 18*a* which engages with an unillustrated engine starter ring is formed on the outer circumferential surface of the inner race 18 at the end which is remote from the motor. The inner race 18 and outer race 17 have rollers 19 disposed therebetween which allow rotational force to be unidirectionally transmitted form the outer race 17 to the inner race 18. The rollers 19 are prevented from moving in the axial direction by an end plate 20 and a cover 21. A stopper 23 for limiting the axial movement of the overrunning clutch 16 is secured to the output shaft 6 by a ring 24. A lever 25 for moving the overrunning clutch 16 along the output shaft 6 in the axial direction thereof has a forked portion at its inner end which fits around the outer race 18 so that the outer race 18 can rotate inside the forked portion. The outer end of the lever 25 is rotatably connected to the plunger 27 of an electromagnetic switch 26. The middle portion of the lever 25 is pivoted on a spring-mounted fulcrum 28**.

The operation of the illustrated apparatus is as follows. When the electromagnetic switch 26 is turned on, the plunger 27 of the switch 26 is pulled inwards (to the left in FIG. 1), and the lever 25 is rotated counterclockwise about the fulcrum 28. The inner end of the lever 25 which fits around the overrunning clutch 16 is swung to the right, causing the overrunning clutch 16 to slide to the right along the helical spline **6*c* of the output shaft 6 until the pinion 18*a* meshes with the unillustrated starter ring of an engine. When the motor is operated, the rotation of the rotor shaft 4 is reduced in speed and transmitted to the output shaft 6 by the planetary reduction gear. The rotation of the output shaft 6 is transmitted to the starter ring via the pinion 18*a* of the overrunning clutch 16, thereby cranking the engine. When the engine has started and come up to speed, the inner race 18 of the overrunning clutch 16 begins to rotate faster than the output shaft 6 and therefore freewheels with respect to the outer race 17. At this time, the electromagnetic switch 26 is turned off, and the plunger 27 moves outwards to the right, the lever 25 pivots in the clockwise direction about the fulcrum 28, the pinion 18*a* of the inner race 18 disengages from the starter ring of the engine, and the overrunning clutch 16** returns to its initial position.

SUMMARY OF THE INVENTION

The present invention improves on the structure of a conventional starter of the type described above by doing away with the intermediate bracket 9 which supports the confronting ends of the rotor shaft 4 and the output shaft 6, thereby reducing the number of parts and simplifying assembly. In the present invention, the yoke is formed by deep drawing of mild steel and includes a support portion which supports the ends of the rotor shaft 4 and the output shaft 6. An intermediate bracket is therefore unnecessary, and a simple, economical, and sturdy structure is achieved.

BRIEF DESCRIPTION OF THE DRAWINGS

In the figures, the same reference numerals indicate the same or corresponding parts.

DESCRIPTION OF THE PREFERRED EMBODIMENT

Figure 2:
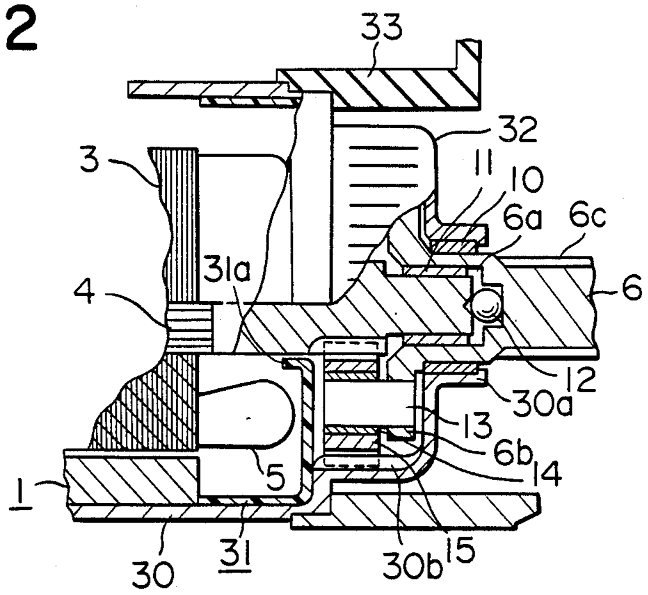
FIG. 2 is a partially cross-sectional view of an embodiment of a starter according to the present invention.
Figure 3:
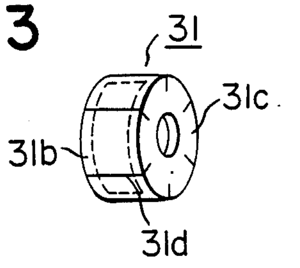
FIG. 3 is a perspective view of the dust-preventing member of FIG. 2.

An embodiment of an engine starter according to the present invention will now be described while referring to FIGS. 2 and 3 of the accompanying drawings. Those parts bearing reference numerals identical to those used in FIG. 1 have the same functions as the corresponding parts in FIG. 1, and their explanation will be omitted.

Figure 1:
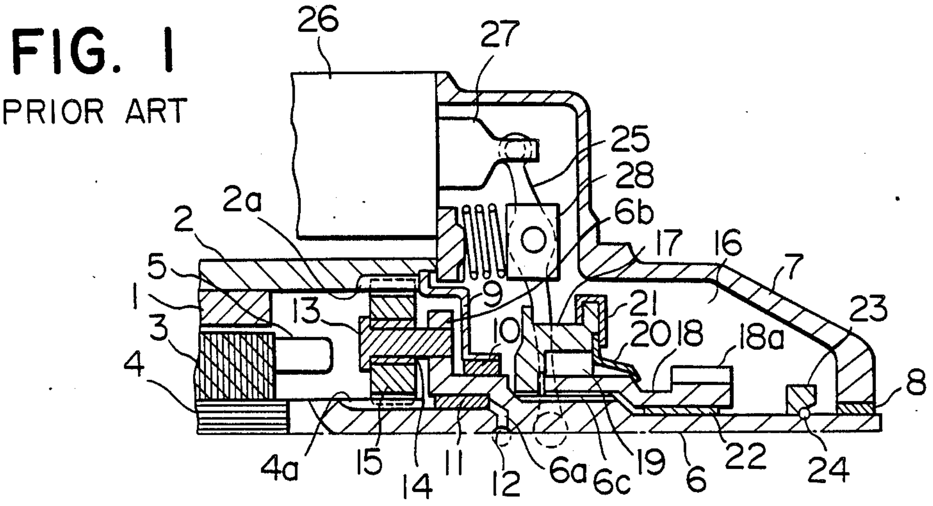
FIG. 1 PRIOR ART
FIG. 1 is a cross-sectional view of a portion of a conventional starter of the type to which the present invention relates.

A motor yoke 30 of this embodiment differs from the conventional yoke 2 of FIG. 1 in that it has a support portion 30*a* which is an integral part thereof. The support portion 30*a* has basically the same cross-sectional shape as the conventional intermediate bracket 9. Like the intermediate bracket 9, the support portion 30*a* serves to support the outer surface of the output shaft 6 through a journal bearing 10. In the present embodiment, the ring gear 30*b* for the planetary reduction gear is formed on the inside surface of the support portion 30*a*. Preferably, the yoke 30 is formed by deep drawing of a thin plate of steel such as mild steel.

Between the planetary reduction gear and the motor is provided a dust-preventing member 31 made of a molded nylon resin which is press fit inside the yoke 30. The dust-preventing member 31 comprises an inner cylindrical portion 31*a*, an outer cylindrical portion 31*b*, and a wall 31*c* connecting the two. The inner cylindrical portion 31*a* acts as a labyrinth seal and prevents dust from entering the motor. The outer cylindrical portion 31*b* has a number of axially-extending grooves 31*d* formed therein which make it easy to press fit the dust-preventing member 31 inside the yoke 30. The support portion 30*a* of the yoke 30 is protected by a cover 32 which fits over it. Element member 33 is a dust-preventing grommet.

The operation of this embodiment is identical to that of the conventional apparatus described above.

Because the support portion 30*a* which supports the output shaft 6 is an integral part of the yoke 30, the assembly of the starter is simpler than that of a conventional starter in which an intermediate bracket 9 must be secured to a yoke 2. Furthermore, since the support portion 30*a* of the yoke 30 can be formed at the same time as the rest of the yoke 30 by deep drawing, providing a one-piece yoke, the number of parts and the manufacturing costs of the apparatus can be reduced.

What is claimed is:

1. An engine starter having a motor and a planetary reduction gear comprising:
   - a rotor having a rotor shaft,
   - an output shaft drivingly connected to said rotor shaft through the planetary reducting gear,
   - a yoke having a cylindrical portion surrounding said stator and a support portion rotatably supporting said output shaft,
   - a sun gear located on an outer surface of said rotor shaft,
   - a ring gear formed on an inner surface of said yoke,
   - said yoke, said support portion, and said ring gear comprising one-piece as formed, and
   - an overrunning clutch mounted on said output shaft and slidable in an axial direction thereof, said overrunning clutch having a starter pinion located thereon and engageable with an engine starter ring.

2. An engine starter according to claim 1, wherein said one-piece yoke is formed by deep drawing of a thin steel plate.

3. An engine starter according to claim 1, wherein said ring gear is located on the innter surface of said support portion of said yoke.

4. An engine starter according to claim 1 further comprising a dust-preventing means mounted inside said yoke and between said planetary reduction gear and said motor for preventing dust from entering said motor from said planetary reduction gear.

5. An engine starter having a motor and a planetary reduction gear comprising:
   - a rotor having a rotor shaft,
   - a stator for said rotor,
   - an output shaft drivingly connected to said rotor shafter through the planetary reduction gear,
   - a one-piece yoke having a support portion integrally formed thereon rotatably supporting said output shaft,
   - a sun gear formed on an outer surface of said rotor shaft,
   - a ring gear formed on an inner surface of said yoke,
   - an overrunning clutch mounted on said output shaft and slidable in an axial direction thereof, said overrunning clutch having a starter pinion formed thereon and engageable with an engine starter ring, and
   - a dust-preventing means for preventing dust from entering said motor from said planetary reduction gear and including:
   - an outer cylindrical portion press fit inside said yoke,
   - an inner cylindrical portion surrounding said rotor shaft so as to form a labyrinth seal around said rotor shaft, and
   - an annular wall portion connected to said inner cylindrical portion and said outer cylindrical portion.

6. An engine starter as according to claim 5 wherein said inner cylindrical portion, said outer cylindrical portion, and said wall portion are integrally molded of nylon resin.

7. An engine starter according to claim 5 wherein said outer cylindrical portion has axially-extending grooves formed in its outer periphery.

* * * * *